(12) United States Patent
Ikeda

(10) Patent No.: US 11,915,878 B2
(45) Date of Patent: Feb. 27, 2024

(54) MULTILAYER CERAMIC CAPACITOR

(71) Applicant: Murata Manufacturing Co., Ltd., Nagaokakyo (JP)

(72) Inventor: Mitsuru Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/232,360

(22) Filed: Apr. 16, 2021

(65) Prior Publication Data
US 2021/0335551 A1 Oct. 28, 2021

(30) Foreign Application Priority Data
Apr. 22, 2020 (JP) .................................. 2020-075810

(51) Int. Cl.
*H01G 4/30* (2006.01)
*H01G 4/012* (2006.01)
(Continued)

(52) U.S. Cl.
CPC .................. *H01G 4/30* (2013.01); *H01G 2/02* (2013.01); *H01G 4/008* (2013.01); *H01G 4/012* (2013.01); *H01G 4/1218* (2013.01)

(58) Field of Classification Search
CPC ............ H01G 4/30; H01G 4/02; H01G 4/008; H01G 4/1218; H01G 4/012; H01G 4/1227; H01G 4/33; H01G 4/248
See application file for complete search history.

(56) References Cited

U.S. PATENT DOCUMENTS

| 9,775,232 | B2 * | 9/2017 | Park | H01G 4/1227 |
| 2014/0063687 | A1 * | 3/2014 | Saito | H01G 4/228 |
| | | | | 361/308.1 |

(Continued)

FOREIGN PATENT DOCUMENTS

| CN | 103794364 A | 5/2014 |
| JP | 2018-032788 A | 3/2018 |

(Continued)

OTHER PUBLICATIONS

English translation of Official Communication issued in corresponding Chinese Patent Application No. 202110427446.2, dated Jun. 17, 2022.

(Continued)

*Primary Examiner* — Michael P McFadden
(74) *Attorney, Agent, or Firm* — Keating & Bennett, LLP

(57) ABSTRACT

A multilayer ceramic capacitor includes a multilayer body, two external electrodes, and two wall portions. The multilayer body includes a multilayer main body including an inner layer portion in which dielectric layers and internal electrode layers are stacked, and two outer layer portions on opposite sides of the inner layer portion in a stacking direction, two side gap portions on opposite sides of the multilayer main body in a width direction, two main surfaces on opposite sides in the stacking direction, two side surfaces on opposite sides in the width direction, and two end surfaces on opposite sides in a length direction. The two external electrodes each are provided at one of the two end surfaces of the multilayer body, and each extend from the one of the two end surfaces to a portion of the main surface. The wall portions cover portions of the external electrodes at the two end surfaces, and each include a protruding portion that protrudes from the main surface.

20 Claims, 9 Drawing Sheets

(51) Int. Cl.
*H01G 2/02* (2006.01)
*H01G 4/008* (2006.01)
*H01G 4/12* (2006.01)

(56) References Cited

U.S. PATENT DOCUMENTS

| | | | |
|---|---|---|---|
| 2014/0116766 A1 | 5/2014 | Jeon et al. | |
| 2014/0204502 A1* | 7/2014 | Chun | H01G 4/30 |
| | | | 361/301.4 |
| 2014/0290999 A1 | 10/2014 | Park et al. | |
| 2015/0022945 A1* | 1/2015 | Park | H01G 4/2325 |
| | | | 156/89.18 |
| 2015/0084487 A1* | 3/2015 | Mori | H01G 4/248 |
| | | | 336/200 |
| 2015/0340156 A1 | 11/2015 | Masunari et al. | |
| 2016/0196918 A1* | 7/2016 | Hong | H01G 4/232 |
| | | | 361/301.4 |
| 2016/0211074 A1 | 7/2016 | Gu et al. | |
| 2016/0351332 A1* | 12/2016 | Lee | H01G 4/232 |
| 2016/0379758 A1* | 12/2016 | Otani | H01G 4/2325 |
| | | | 361/301.4 |
| 2017/0018363 A1* | 1/2017 | Tanaka | H01G 4/30 |
| 2017/0154731 A1* | 6/2017 | Tahara | H01G 4/232 |
| 2017/0256359 A1* | 9/2017 | Masunari | H01G 4/005 |
| 2017/0278635 A1* | 9/2017 | Mizuno | H01G 2/065 |
| 2017/0330689 A1* | 11/2017 | Hatanaka | H01G 2/065 |
| 2018/0061576 A1 | 3/2018 | Nakamura et al. | |
| 2018/0166217 A1* | 6/2018 | Kato | H01G 4/012 |
| 2018/0174753 A1* | 6/2018 | Terashita | H01G 4/008 |
| 2019/0148070 A1* | 5/2019 | Kobayashi | H01G 4/232 |
| | | | 174/260 |
| 2019/0164693 A1 | 5/2019 | Ono et al. | |
| 2019/0164695 A1* | 5/2019 | Cho | H01G 4/005 |
| 2019/0355522 A1* | 11/2019 | Kanbe | H01G 4/232 |
| 2020/0402717 A1* | 12/2020 | Lee | H01G 4/008 |

FOREIGN PATENT DOCUMENTS

KR 101462769 B1 11/2014
KR 1020150135092 A 12/2015

OTHER PUBLICATIONS

Office Action in KR10-2021-0050948, dated Jun. 12, 2023, 4 pages.

* cited by examiner

MULTILAYER CERAMIC CAPACITOR

CROSS REFERENCE TO RELATED APPLICATIONS

This application claims the benefit of priority to Japanese Patent Application No. 2020-075810 filed on Apr. 22, 2020. The entire contents of this application are hereby incorporated herein by reference.

BACKGROUND OF THE INVENTION

1. Field of the Invention

The present invention relates to a multilayer ceramic capacitor.

2. Description of the Related Art

Recently, a large-capacitance and small-size multilayer ceramic capacitor has been demanded. Such a multilayer ceramic capacitor includes an inner layer portion in which dielectric layers made of a ferroelectric material having a relatively high dielectric constant and internal electrodes are alternately stacked. Furthermore, dielectric layers as outer layer portions are provided on the upper and lower portions of the inner layer portion, thereby forming a rectangular multilayer body. Furthermore, side gap portions are provided on both side surfaces of the rectangular multilayer body in the width direction, and external electrodes are provided on both end surfaces thereof in the longitudinal direction. Furthermore, such a multilayer ceramic capacitor is generally mounted on a substrate by solder (see, for example, Japanese Unexamined Patent Application, Publication No. 2018-32788).

However, since the dielectric layers have piezoelectric and electrostrictive properties, stress and mechanical strain occur when an electric field is applied. Such stress and mechanical strain cause vibration, which is then transmitted to a substrate on which the multilayer ceramic capacitor is mounted. In this situation, the entire substrate serves as an acoustic reflecting surface, and "acoustic noise", which is a vibration sound as noise, is generated.

In a case in which a solder extends to a position in a height direction of an external electrode at which an inner layer portion therein is present when a multilayer ceramic capacitor is mounted on a substrate, the vibration is easily transmitted to the substrate through the solder, and thus "acoustic noise" is likely to be generated.

SUMMARY OF THE INVENTION

Preferred embodiments of the present invention provide multilayer ceramic capacitors that are each capable of reducing or preventing the generation of "acoustic noise".

A multilayer ceramic capacitor according to a preferred embodiment of the present invention includes a multilayer body, two external electrodes, and two wall portions. The multilayer body includes a multilayer main body including an inner layer portion including a plurality of dielectric layers and a plurality of internal electrode layers that are alternately stacked, and two outer layer portions respectively on opposite sides of the inner layer portion in a stacking direction, two side gap portions on opposite sides of the multilayer main body in a width direction intersecting the stacking direction, two main surfaces on opposite sides in the stacking direction, two side surfaces on opposite sides in the width direction intersecting the stacking direction, and two end surfaces on opposite sides in a length direction intersecting the stacking direction and the width direction, the two external electrodes each being provided at one of the two end surfaces of the multilayer body, and each extending from the one of the two end surfaces to a portion of the main surface, and the wall portions respectively covering portions of the external electrodes provided at the two end surfaces, and each including a protruding portion that protrudes from the main surface.

According to preferred embodiments of the present invention, it is possible to provide multilayer ceramic capacitors that are each capable of reducing or preventing the generation of "acoustic noise".

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
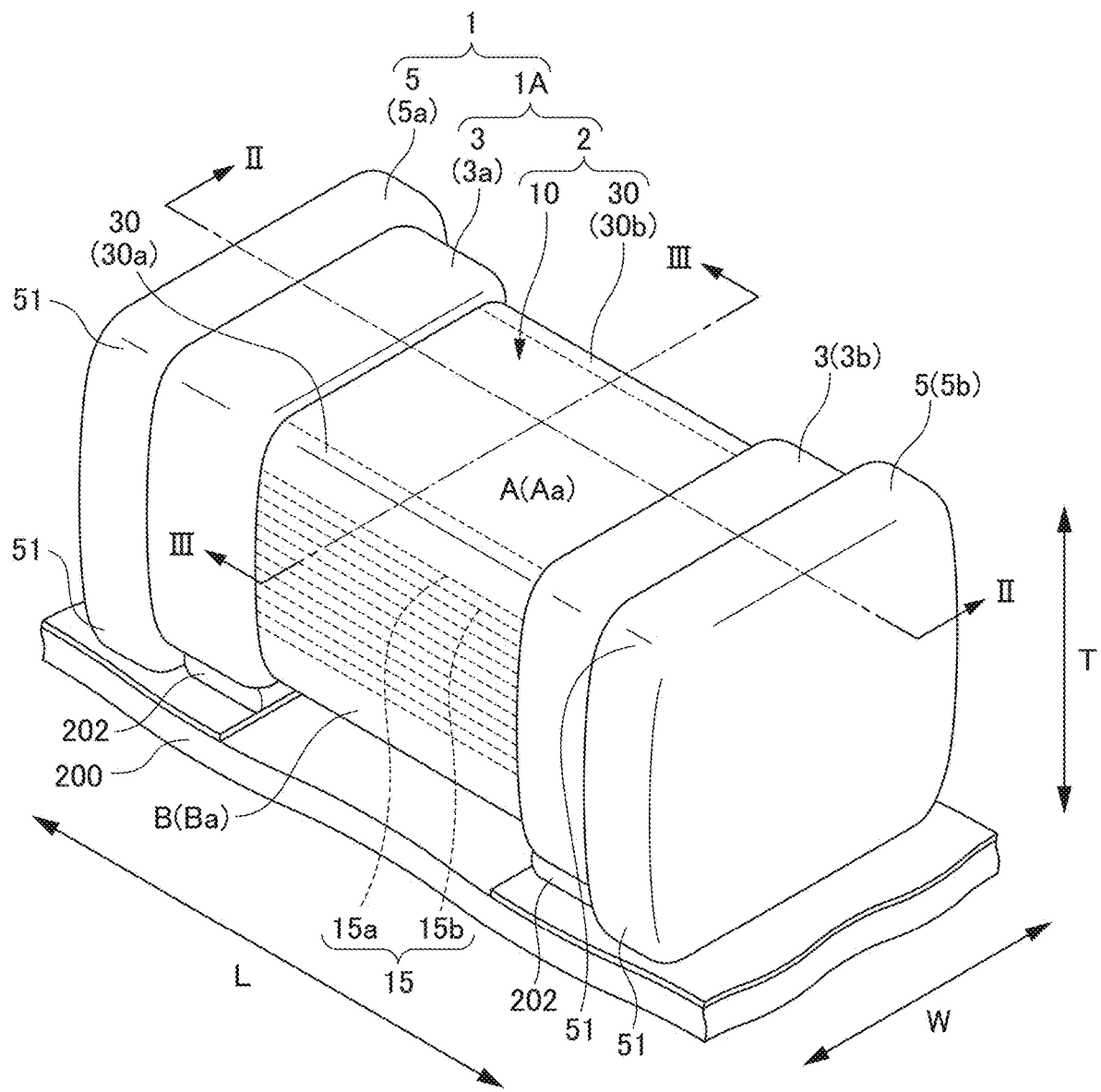
FIG. 1 is a schematic perspective view of a multilayer ceramic capacitor according to a preferred embodiment of the present invention.
Figure 2:
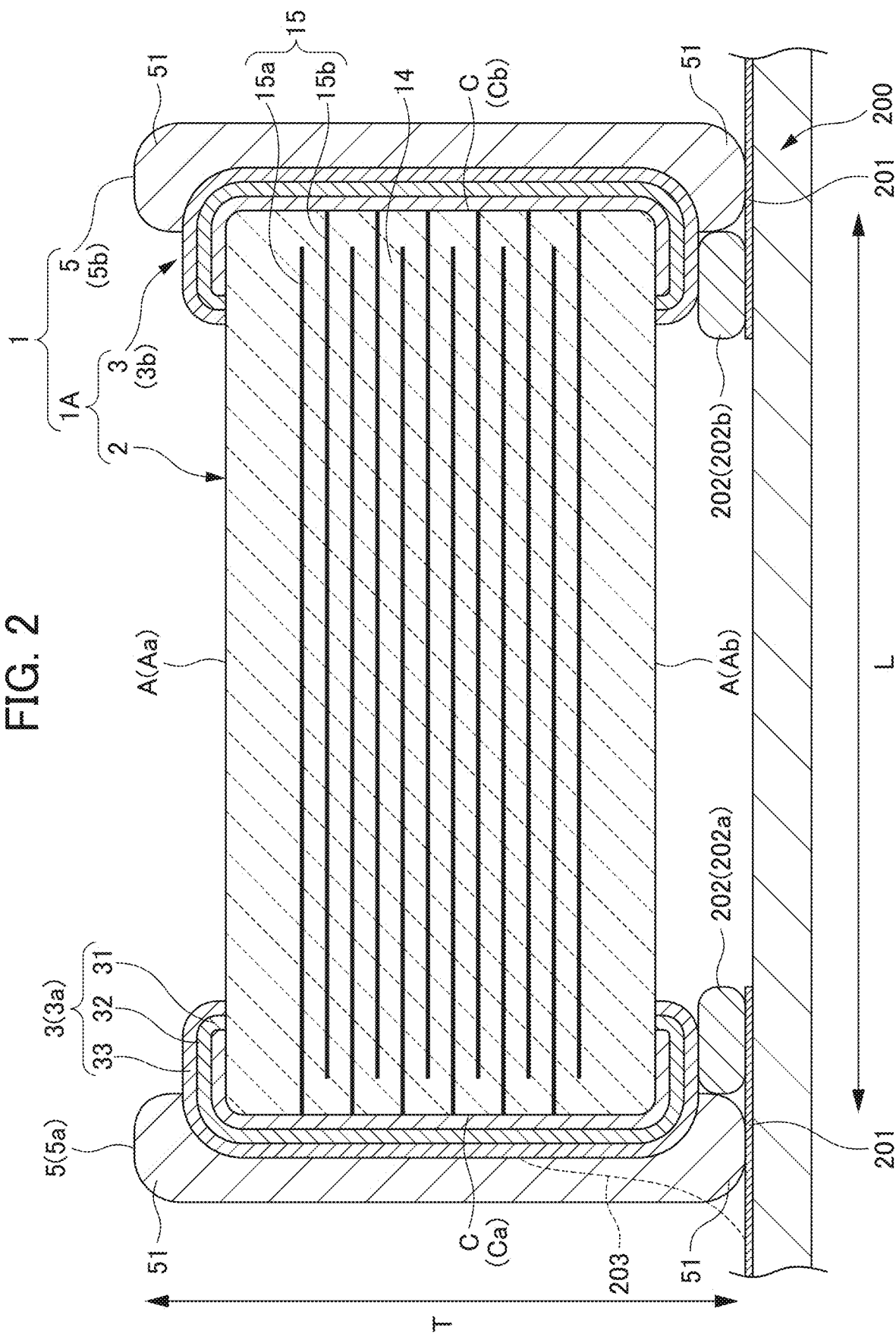
FIG. 2 is a cross-sectional view taken along the line II-II of the multilayer ceramic capacitor of FIG. 1.
Figure 3:
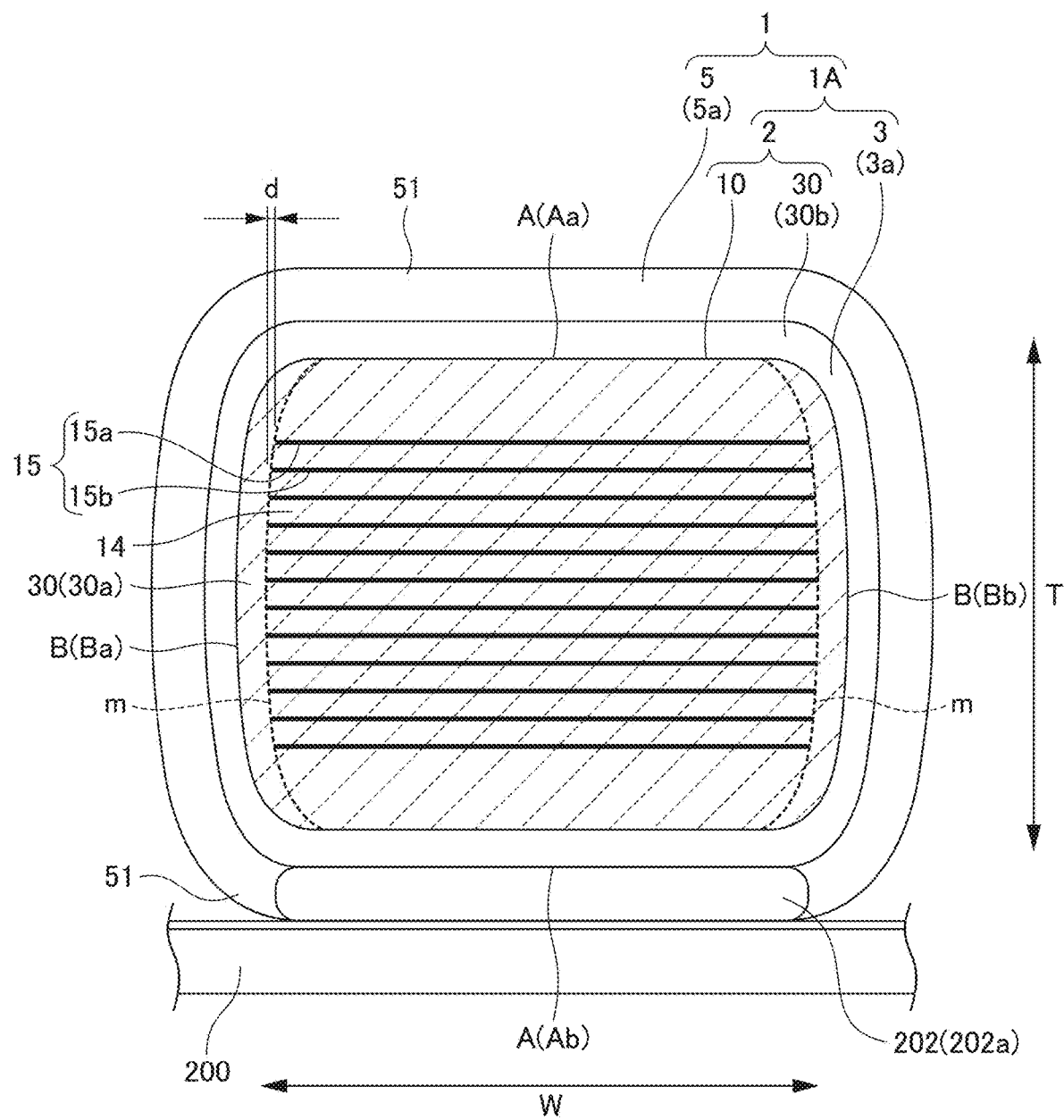
FIG. 3 is a cross-sectional view taken along the line III-III of the multilayer ceramic capacitor of FIG. 1.

Hereinafter, multilayer ceramic capacitors according to preferred embodiments of the present invention will be described with reference to the drawings. FIG. 1 is a schematic perspective view of a multilayer ceramic capacitor 1 according to a preferred embodiment of the present invention, showing a state mounted on a substrate 200. FIG. 2 is a cross-sectional view taken along the line II-II of the multilayer ceramic capacitor 1 in FIG. 1. FIG. 3 is a cross-sectional view taken along the line III-III of the multilayer ceramic capacitor 1 in FIG. 1.

The multilayer ceramic capacitor 1 has a rectangular or substantially rectangular shape, and includes a multilayer body 2 and a pair of external electrodes 3 provided at both ends of the multilayer body 2, and a pair of wall portions 5 provided on outer sides of the pair of external electrodes 3. The multilayer body 2 includes an inner layer portion 11 including a plurality of sets of a dielectric layer 14 and an internal electrode layer 15.

In the following description, as a term representing the orientation of the multilayer ceramic capacitor 1, the direction in which the pair of external electrodes 3 are provided in the multilayer ceramic capacitor 1 is defined as the length direction L. The direction in which the dielectric layers 14 and the internal electrode layers 15 are stacked (or laminated) is defined as the stacking direction T. The direction intersecting both the length direction L and the stacking direction T is defined as the width direction W. It should be noted that, in the present preferred embodiment, the width direction is orthogonal or substantially orthogonal to both of the length direction L and the stacking direction T.

Figure 4:
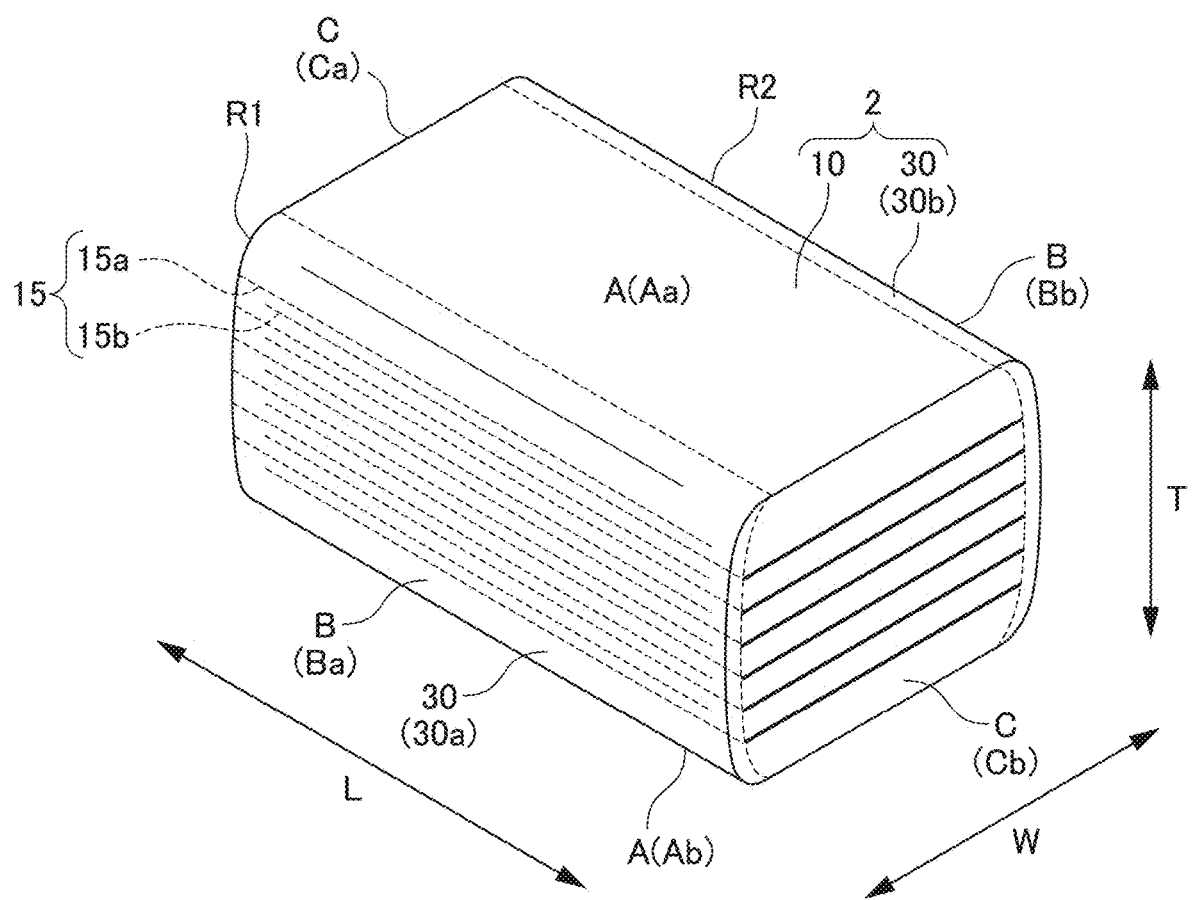
FIG. 4 is a schematic perspective view of a multilayer body according to a preferred embodiment of the present invention.
Figure 5:
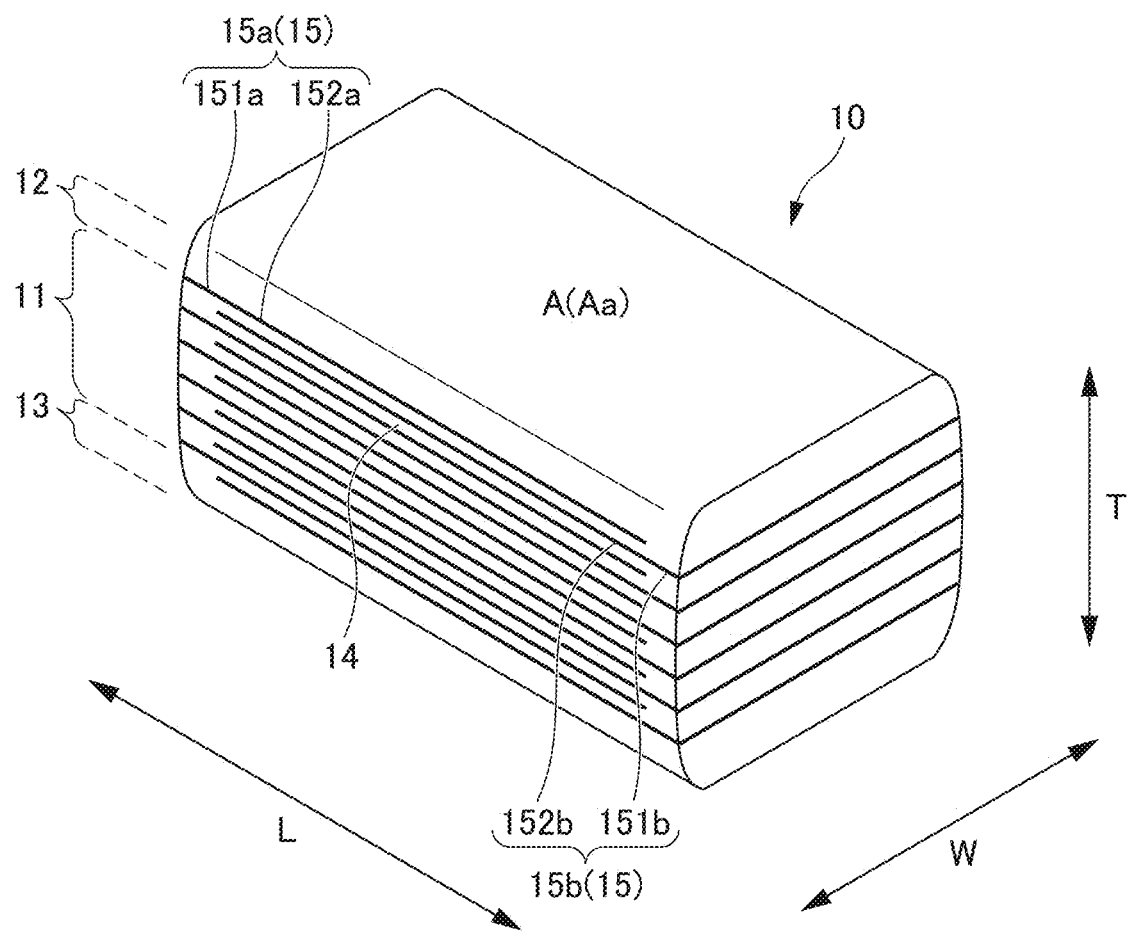
FIG. 5 is a schematic perspective view of a main body of the multilayer body of FIG. 4.

FIG. 4 is a schematic perspective view of the multilayer body 2. The multilayer body 2 includes a multilayer main body 10, and a side gap portion 30. FIG. 5 is a schematic perspective view of the multilayer main body 10. In the following description, among the six outer surfaces of the multilayer body 2 shown in FIG. 4, a pair of outer surfaces on opposite sides in the stacking direction T are defined respectively as a first main surface Aa and a second main surface Ab, a pair of outer surfaces on opposite sides in the width direction W are respectively defined as a first side surface Ba and a second side surface Bb, and a pair of outer surfaces on opposite sides in the length direction L are respectively defined as a first end surface Ca and a second end surface Cb.

It should be noted that, in a case in which it is not necessary to specifically distinguish the first main surface Aa and the second main surface Ab from each other, they will be collectively described as the main surface A, in a case in which it is not necessary to specifically distinguish the first side surface Ba and the second side surface Bb from each other, they will be collectively described as the side surface B, and in a case in which it is not necessary to specifically distinguish the first end surface Ca and the second end surface Cb from each other, they will be collectively described as the end surface C.

The side gap portion 30 includes a first side gap portion 30a provided adjacent to the first side surface Ba of the multilayer main body 10 and a second side gap portion 30b provided adjacent to the second side surface Bb of the multilayer main body 10.

It should be noted that, in a case in which it is not necessary to specifically distinguish the first side gap portion 30a and the second side gap portion 30b from each other, they will be collectively described as the side gap portion 30.

The multilayer body 2 is preferably rounded at a corner R1 and a ridge R2. The corner R1 is a portion where the main surface A, the side surface B, and the end surface C intersect. The ridge R2 is a portion where two surfaces of the multilayer body 2, i.e., the main surface A and the side surface B, the main surface A and the end surface C, or the side surface B and the end surface C intersect. In addition, irregularities and the like, for example, may be provided on a portion or all of the main surface A, the side surface B, and the end surface C of the multilayer body 2. The dimension of the multilayer body 2 is not particularly limited. However, for example, it is preferable that the dimension in the length direction L is about 0.2 mm or more and about 10 mm or less, the dimension in the width direction W is about 0.1 mm or more and about 10 mm or less, and the dimension in the stacking direction T is about 0.1 mm or more and about 5 mm or less.

As shown in FIG. 5, the multilayer main body 10 includes the inner layer portion 11, an upper outer layer portion 12 disposed adjacent to the first main surface Aa e of the inner layer portion 11, and a lower outer layer portion 13 disposed adjacent to the second main surface Ab.

The inner layer portion 11 includes the plurality of sets of the dielectric layer 14 and the internal electrode layer 15 which are alternately stacked along the stacking direction T.

The dielectric layer 14 preferably has a thickness of, for example, about 0.5 µm or less. The dielectric layer 14 is made of a ceramic material. As the ceramic material, for example, a dielectric ceramic including $BaTiO_3$ as a main component may preferably be used. Furthermore, a ceramic material obtained by adding at least one of sub-components such as, for example, Mn compounds, Fe compounds, Cr compounds, Co compounds, and Ni compounds to these main components may be used. It should be noted that the number of dielectric layers 14 including the multilayer main body 10 including the upper outer layer portion 12 and the lower outer layer portion 13 is preferably 15 sheets or more and 700 sheets or less, for example.

The internal electrode layer 15 includes a plurality of first internal electrode layers 15a and a plurality of second internal electrode layers 15b. The first internal electrode layers 15a and the second internal electrode layers 15b are alternately arranged. It should be noted that, when it is not necessary to distinguish the first internal electrode layer 15a from the second internal electrode layer 15b, they will be collectively described as the internal electrode layer 15.

The first internal electrode layer 15a includes a first opposing portion 152a provided opposite to the second internal electrode layer 15b, and a first lead-out portion 151a extending from the first opposing portion 152a to the side of the first end surface Ca. An end of the first lead-out portion 151a is exposed on the first end surface Ca and is electrically connected to a first external electrode 3a to be described later.

The second internal electrode layer 15b includes a second opposing portion 152b provided opposite to the first internal electrode layer 15a, and a second lead-out portion 151b extending from the second opposing portion 152b to the second end surface Cb. An end of the second lead-out portion 151b is electrically connected to a second external electrode 3b to be described later.

Charges are accumulated between the first opposing portion 152a of the first internal electrode layer 15a and the second opposing portion 152b of the second internal electrode layer 15b, such that the characteristics of the capacitor are provided.

As shown in FIG. 3, in the WT cross-section which is a cross section of the width direction W and the stacking direction T passing through the center or approximate center of the multilayer body 2, the positional deviation d in the stacking direction T between the ends in the width direction W of the first internal electrode layer 15a and the second internal electrode layer 15b which are adjacent to each other in the stacking direction T is preferably about 0.5 µm or less, for example.

That is, the ends in the width direction W of the first internal electrode layer 15a and the second internal electrode layer 15b vertically adjacent to each other in the stacking direction T is at the same position or substantially at the same position on the width direction W, the positions of the ends are aligned in the stacking direction T.

On the other hand, in the WT cross-section which is a cross section of the width direction W and the stacking direction T passing through the center or approximate center of the multilayer body 2 shown in FIG. 3 in the same or similar manner, a line m shown by a dotted line in FIG. 3 connecting all of the ends in the width direction W of the first internal electrode layers 15a and the second internal electrode layers 15b provided adjacent to each other in the stacking direction T is slightly convex toward the outside. In other words, the internal electrode layer 15 is pressed and extends at the center or approximate center portion in the stacking direction T of the first internal electrode layer 15a and the second internal electrode layer 15b. The upper end and the lower end in the stacking direction T are pressed inward and withdrawn. It should be noted that the convex shape can also be referred to as a drum shape.

That is, the ends in the width direction W of the first internal electrode layer 15a and the second internal electrode layer 15b are at the same position or substantially at the same position on the width direction W when the adjacent two layers in the stacking direction T are viewed, while, when the ends along the entire length in the stacking direction T are viewed, they are in a slightly convex shape toward the outside. The reason for such convexity will be described later.

The internal electrode layer 15 is preferably made of a metallic material such as Ni, Cu, Ag, Pd, or Au, or Ag—Pd alloy, for example. The thickness of the internal electrode layer 15 is preferably about 0.5 μm or less, for example. The number of the internal electrode layers 15 is preferably, for example, 15 or more and 200 or less in total of the first internal electrode layer 15a and the second internal electrode layer 15b.

The upper outer layer portion 12 and the lower outer layer portion 13 are made of the same material as the dielectric layer 14 of the inner layer portion 11. The thickness of each of the upper outer layer portion 12 and the lower outer layer portion 13 is preferably about 20 μm or more and about 60 μm or less, and more preferably about 20 μm or more and about 40 μm or less, for example.

As shown in FIGS. 3 and 4, the first side gap portion 30a is provided on the side of the first side surface Ba of the multilayer main body 10 in the width direction W. The second side gap portion 30b is provided on the side of the second side surface Bb of the multilayer main body 10 in the width direction W. It should be noted that, in a case in which it is not necessary to specifically distinguish the first side gap portion 30a and the second side gap portion 30b from each other, they will be collectively described as the side gap portion 30.

The side gap portion 30 covers the end on the side in the width direction W of the internal electrode layer 15 which is exposed on both sides of the multilayer main body 10. The side gap portion 30 is made of the same material as the dielectric layer 14, and further includes, for example, Mg as a sintering aid. Mg migrates to the side of the internal electrode layer 15 during sintering of the side gap portion 30, such that Mg is segregated on the side of the side gap portion 30 in contact with the internal electrode layer 15. Furthermore, an interface is provided between the multilayer main body 10 and the side gap portion 30.

The particle size of the grain of the dielectric of the side gap portion 30 becomes reduced from the inner layer toward the outside. For example, the particle size of the grain is preferably about 400 nm or more and about 450 nm or less at the outermost side, and about 600 nm or more at the innermost side, and the particle size of the innermost grain is preferably about 1.5 times or more than the particle size of the outermost grain. It should be noted that, regarding the particle size of the grain, the side gap portion 30 is assumed to be divided into a plurality of regions each having a dimension of about 20 nm in the width direction from the side surface side at the center or approximate center portion in the stacking direction T of the side gap portion 30, and for each region, the area of the particle size is measured, and the area is converted into a circle equivalent diameter to determine the average particle diameter in each region. The region of less than about 20 nm will have the average particle diameter to be defined within the region.

As shown in FIGS. 1 and 4, the thickness of the side gap portion 30 is preferably such that the internal electrode layer 15 is visually recognizable when viewed from the outside of the side gap portion 30. For example, the visually recognizable thickness is preferably about 20 μm, and more preferably about 10 μm or less. The situation in which the internal electrode layers 15 are visually recognizable refers to a situation in which, when the multilayer ceramic capacitor 1 is viewed from the outside of the side gap portion 30, it is possible to visually recognize the internal electrode layers 15 such that the locations of the internal electrode layers can be confirmed. It should be noted that whether or not the internal electrode layer 15 can be visually recognized can also be determined by the transmittance, and for example, when the transmittance is about 20% or more, it can be determined that the internal electrode layer 15 can be visually recognized.

Furthermore, the side gap portion 30 is a single layer in the present preferred embodiment. However, the present invention is not limited thereto, and the side gap portion 30 may have a two-layer structure including an outer side gap layer located on the outside and an inner side gap layer located on the side of the internal electrode layer 15.

It should be noted that, as described above, regarding the internal electrode layer 15, a line connecting the ends of the internal electrode layers 15 on the side of the side surface B in the WT cross section has a convex shape toward the outside. Therefore, the side gap portion 30 provided on the outside also has a convex shape toward the outside in the WT cross section.

The external electrode 3 includes a first external electrode 3a provided on the first end surface Ca of the multilayer body 2, and a second external electrode 3b provided on the second end surface Cb of the multilayer body 2. It should be noted that, in a case in which it is not necessary to specifically distinguish the first external electrode 3a and the second external electrode 3b, they will be collectively described as an external electrode 3. The external electrode 3 covers not only the end surface C but also a portion of each of the main surface A and the side surface B close to the end surface C.

As described above, the end of the first lead-out portion 151a of the first internal electrode layer 15a is exposed to the first end surface Ca and electrically connected to the first external electrode 3a. Furthermore, the end of the second lead-out portion 151b of the second internal electrode layer 15b is exposed to the second end surface Cb, and is electrically connected to the second external electrode 3b. This provides a structure in which a plurality of capacitor elements are electrically connected in parallel between the first external electrode 3a and the second external electrode 3b.

Furthermore, the external electrode 3 includes a three-layer structure including a foundation electrode layer 31, a conductive resin layer 32 provided on the foundation electrode layer 31, and a plated layer 33 provided on the conductive resin layer 32.

The foundation electrode layer 31 is provided, for example, by applying and firing a conductive paste including a conductive metal and glass. As the conductive metal of the foundation electrode layer 31, for example, Cu, Ni, Ag, Pd, Ag—Pd alloy, Au or the like may be used. The conductive resin layer 32 covers the foundation electrode layer 31.

The conductive resin layer 32 has any configuration including a thermosetting resin and a metal component. As specific examples of the thermosetting resin, various known thermosetting resins such as epoxy resin, phenolic resin, urethane resin, silicone resin, polyimide resin, and the like can be used. As the metal component, for example, Ag or a metal powder coated with Ag on the surface of the base metal powder can be used.

The plated layer 33 preferably includes plating of one metal or an alloy including the metal selected from the group consisting of, for example, Cu, Ni, Su, Ag, Pd, Ag—Pd alloy, Au, or the like.

Thus, since the conductive resin layer 32 includes a thermosetting resin, for example, the conductive resin layer 32 is more flexible than the foundation electrode layer 31 made of a plated film or a fired product of a conductive paste. Therefore, even when an impact caused by physical shock or thermal cycling to the multilayer ceramic capacitor 1 is applied, the conductive resin layer 32 defines and functions as a buffer layer, such that the generation of cracks in the multilayer ceramic capacitor 1 is prevented, piezoelectric vibration is easily absorbed, and an effect of reducing or preventing the "acoustic noise" is provided.

The wall portion 5 includes a first wall portion 5a provided on the side of the first end surface Ca of the capacitor main body 1A including the multilayer body 2 and the external electrodes 3, and a second wall portion 5b provided on the side of the second end surface Cb of the capacitor main body 1A. It should be noted that, in a case in which it is not necessary to specifically distinguish between the first wall portion 5a and the second wall portion 5b, they will be collectively described as the wall portion 5.

In the present preferred embodiment, the wall portion 5 is thermally cured after applying insulating resin to the end surface C.

Since the wall portion 5 is applied on an outer periphery of the portion at which the external electrode 3 of the capacitor main body 1A is provided, the wall portion 5 has a size larger than the outer periphery of the external electrode 3. In other words, one end in the stacking direction T protrudes from the first main surface Aa of the capacitor main body 1A, and the other end in the stacking direction T protrudes from the second main surface Ab of the capacitor main body 1A. With such a configuration, protruding portions 51 of the wall portion 5 are provided, which are portions that protrude from the first main surface Aa and the second main surface Ab of the capacitor main body 1A.

However, the protruding portions 51 may not be provided on both sides of the first main surface Aa and the second main surface Ab. It will suffice if the protruding portion 51 is provided at least on the side of the main surface Ab of the capacitor main body 1A.

The protruding amount of the protruding portion 51 is preferably, for example, about 5% or more and about 200 μm or less of the thickness of the capacitor main body 1A in the stacking direction T. In a case in which the protruding amount of the protruding portion 51 is less than about 5% of the thickness of the capacitor main body 1A in the stacking direction, it is difficult for the effect of reducing "acoustic noise" to be obtained, and in a case in which the protruding amount of the protruding portion 51 exceeds about 250 μm, cracks may occur in the wall portion 5. It should be noted that, in a case in which the protruding amount of the protruding portion 51 is about 15% or more of the thickness of the capacitor main body 1A in the stacking direction, it is possible to further reduce the acoustic noise.

It should also be noted that a substrate including insulating resin as a main material component may be affixed. Furthermore, the wall portion may not be made of insulating resin, but rather may be made of metal, for example.

As shown in FIGS. 1 to 3, when the multilayer ceramic capacitor 1 having the above configuration is mounted on the substrate 200, the protruding portions 51 are brought into contact with the substrate 200 on the side of the second main surface Ab of the capacitor main body 1A. Furthermore, the external electrodes 3 are joined with terminal portions provided on the substrate 200 shown in FIG. 2 by solder 202.

It should be noted that a conduction portion may be provided on the inner surface side, i.e., on the side surface on the side of the solder 202, of the protruding portion 51 on the side of the second main surface Ab, thus reliably establishing the connection between the external electrode 3 and the terminal portion 201.

The solder 202 is preferably, for example, a Pb-free solder 202 having a high melting point. In a case in which a Pb-free solder 202 having a high melting point is used, it is possible to ensure the joint strength between the multilayer ceramic capacitor 1 and the terminal portion 201, while ensuring heat resistance of the joint portion to the flow or reflow temperature during the substrate being mounted.

The Pb-free solder 202 having a high melting point is preferably, for example, Sn—Sb, Sn—Ag—Cu, Sn—Cu, or Sn—Bi Pb-free solder 202, and among them, more preferably Sn-10Sb to Sn-15Sb solder 202. This makes it possible to ensure heat resistance of the joint portion during the substrate being mounted.

Figure 6:
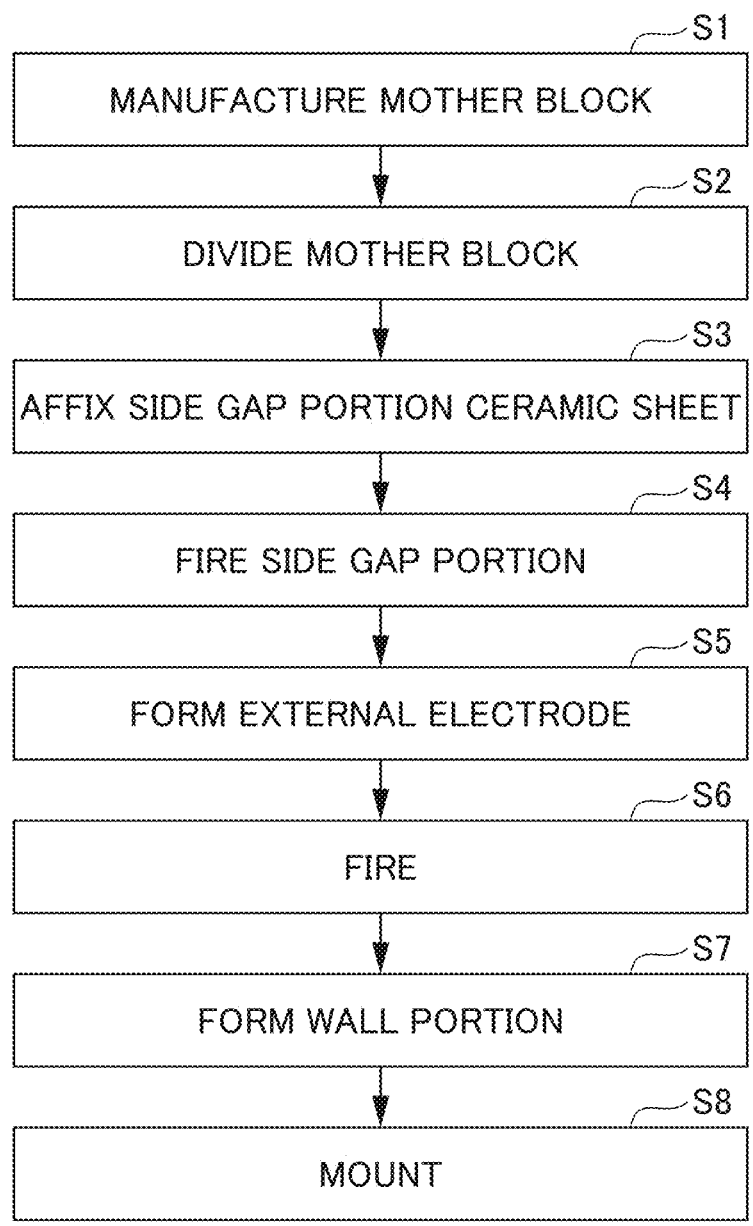
FIG. 6 is a flowchart for explaining a non-limiting example of a method of manufacturing a multilayer ceramic capacitor according to a preferred embodiment of the present invention.
Figure 7:
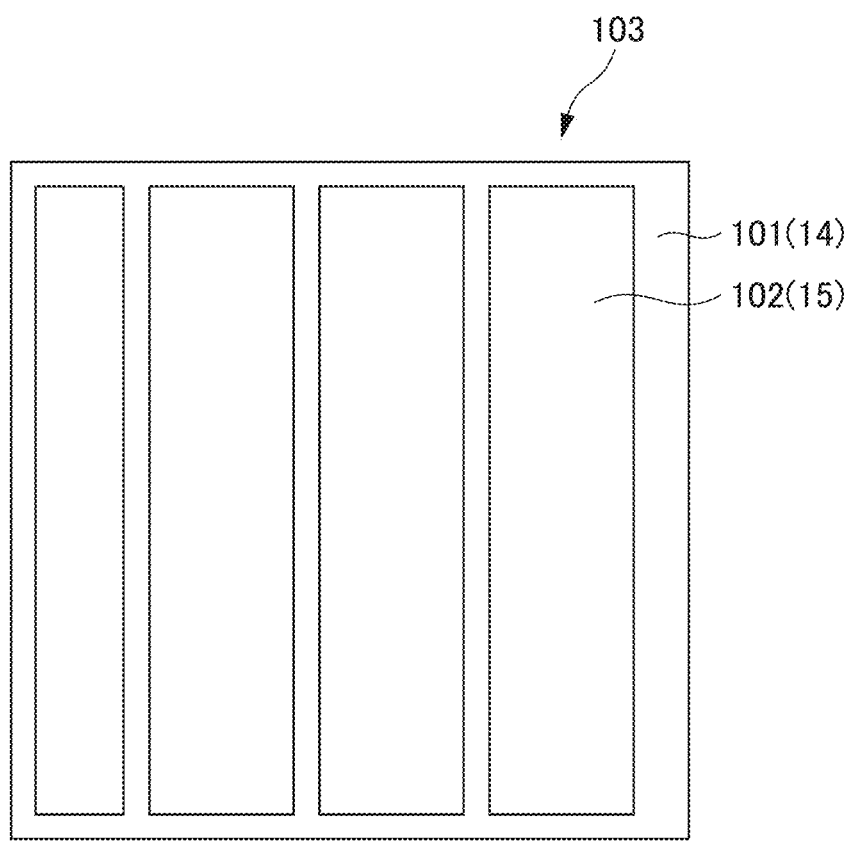
FIG. 7 is a schematic plan view of material sheets.
Figure 8:
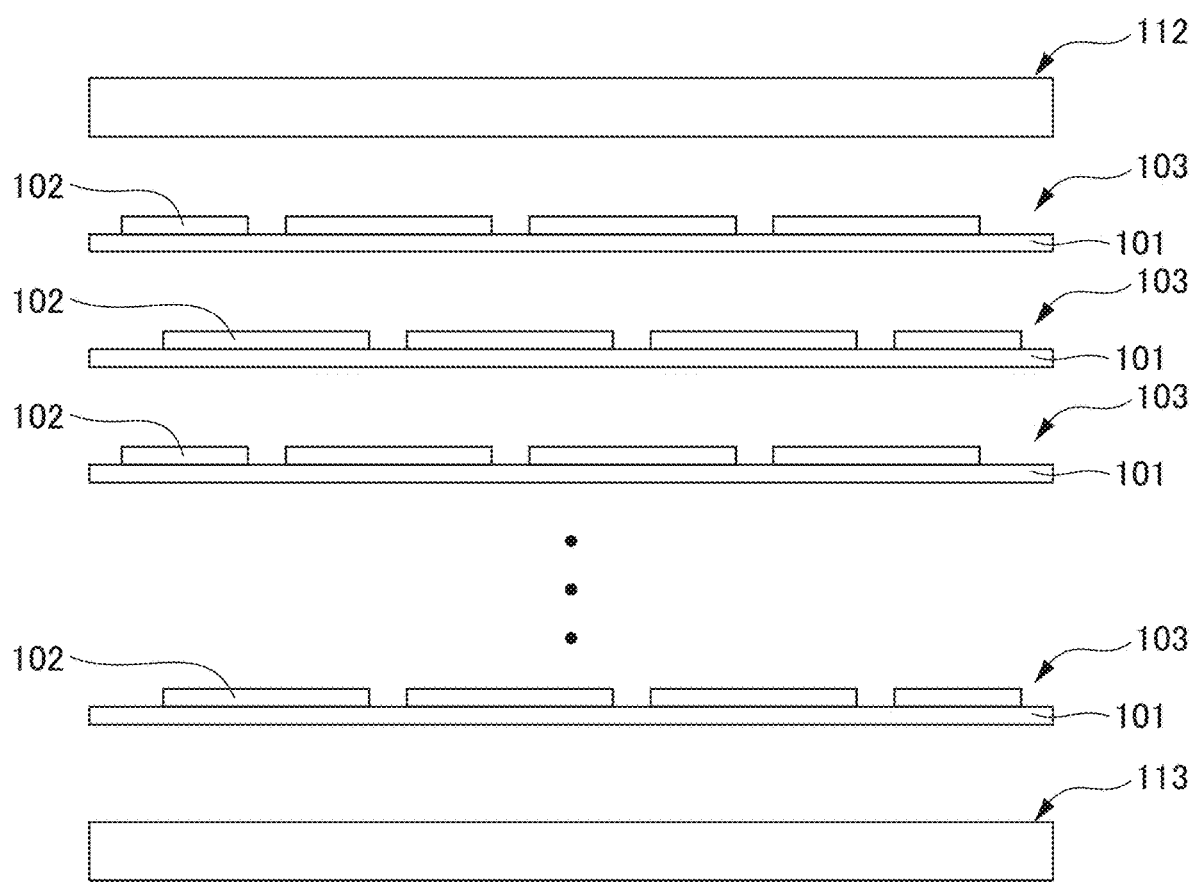
FIG. 8 is a schematic view showing a stacked state of the material sheets.
Figure 9:
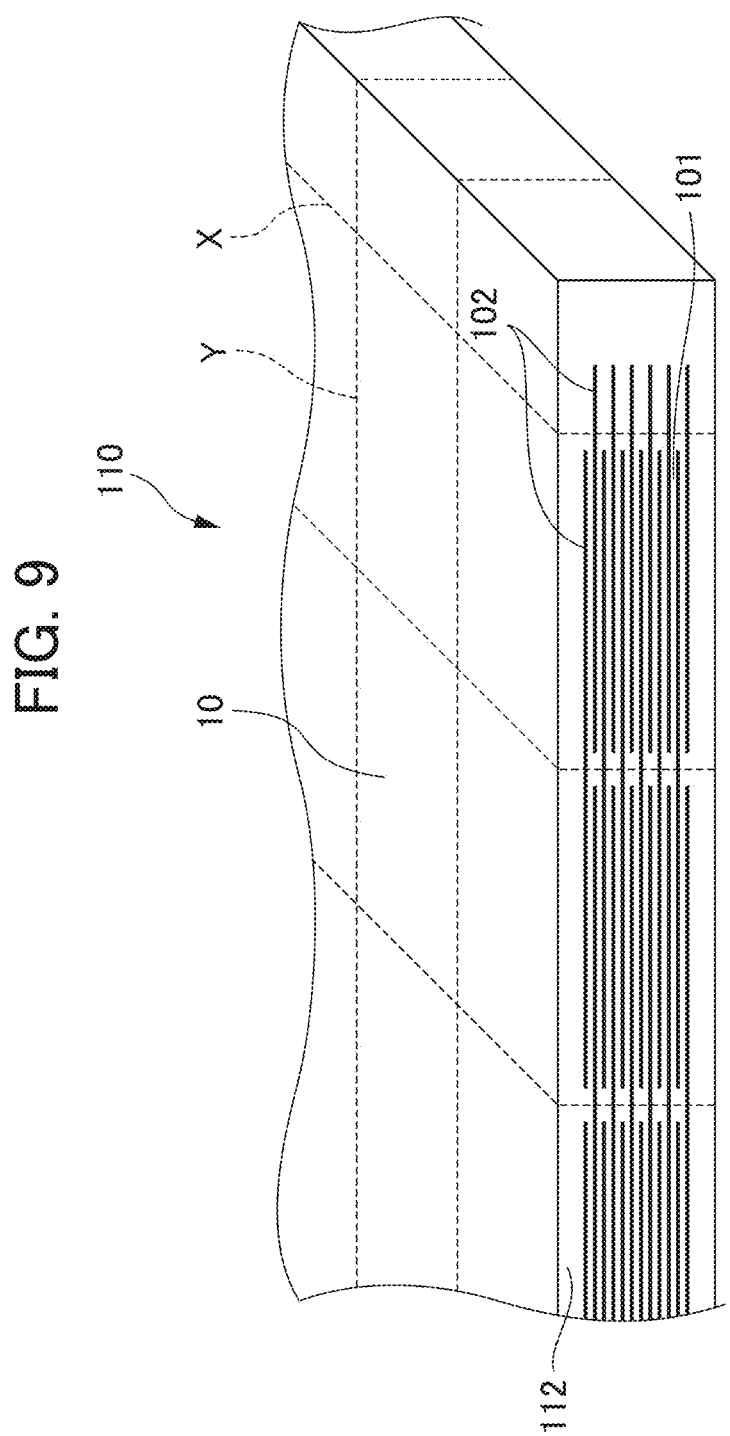
FIG. 9 is a schematic perspective view of a mother block.

FIG. 6 is a flowchart for explaining a non-limiting example of a manufacturing method of the multilayer ceramic capacitor 1 and a mounting method to the substrate 200. FIG. 7 is a schematic plan view of material sheets 103. FIG. 8 is a schematic view showing a stacked state of the material sheets 103. FIG. 9 is a schematic perspective view of a mother block 110.

Mother Block Manufacturing Step S1

First, a ceramic slurry including a ceramic powder, a binder, and a solvent is prepared. The ceramic slurry is formed in a sheet shape on a carrier film by using a die coater, gravure coater, micro gravure coater, or the like, for example, thus manufacturing a multilayer ceramic green sheet 101.

Subsequently, the conductive paste is printed onto the multilayer ceramic green sheet 101 by screen printing, ink jet printing, gravure printing or the like, for example, so as to have a strip-shaped pattern, thus forming a conductive pattern 102.

Thus, as shown in FIG. 7, the material sheet 103 is provided in which the conductive pattern 102 defining and functioning as the internal electrode layer 15 is printed on the surface of the multilayer ceramic green sheet 101 defining and functioning as the dielectric layer 14.

Subsequently, as shown in FIG. 8, a plurality of material sheets 103 are stacked. More specifically, the plurality of material sheets 103 are stacked such that the strip-shaped conductive patterns 102 are directed in the same direction, and the strip-shaped conductive patterns 102 are shifted by half a pitch in the width direction between the adjacent material sheets 103. Furthermore, an upper outer layer portion ceramic green sheet 112 defining and functioning as the upper outer layer portion 12 is stacked on one side of the plurality of stacked material sheet 103, while a lower outer layer portion ceramic green sheet 113 defining as the lower outer layer portion 13 is stacked on the other side thereof.

Subsequently, the upper outer layer portion ceramic green sheet 112, the plurality of stacked material sheets 103, and the lower outer layer portion ceramic green sheet 113 are subjected to thermocompression bonding. As a result, the mother block 110 shown in FIG. 9 is formed.

Mother Block Dividing Step S2

Next, as shown in FIG. 9, the mother block 110 is divided along a cutting line X and a cutting line Y intersecting the cutting line X corresponding to the dimension of the multilayer main body 10. As a result, a plurality of multilayer main body 10 shown in FIG. 5 are manufactured. It should be noted that, in the present preferred embodiment, the cutting line Y is orthogonal or substantially orthogonal to the cutting line X.

Here, the multilayer main body 10 that has been cut is pressed in the stacking direction in order to prevent peeling of the stacked dielectric layer 15 in the stacking direction. Then, the internal electrode layer 15, i.e., the center or approximate center portion of the first internal electrode layer 15a and the second internal electrode layer 15b in the stacking direction T, is pressed to extend. Therefore, as shown in FIG. 5, in the WT cross-section, the line m shown by a dotted line in the drawings connecting all of the ends in the width direction W of the first internal electrode layers 15a and the second internal electrode layers 15b provided adjacent to each other in the stacking direction T is slightly convex toward the outside.

Side Gap Portion Ceramic Green Sheet Affixing Step S3

Next, a ceramic slurry in which Mg is added as a sintering aid to the same dielectric powder as that of the multilayer ceramic green sheet 101 is produced. Then, a ceramic slurry is applied on the resin film, and dried to produce a side gap portion ceramic green sheet.

Then, by affixing the side gap portion ceramic green sheet on the side portion where the internal electrode layer 15 of the multilayer main body 10 is exposed, the layer is formed as the side gap portion 30. At this time, the side gap ceramic green sheet is pressed so as to extend to the side portion where the internal electrode layer 15 of the multilayer main body 10 is exposed.

Side Gap Portion Firing Step S4

The multilayer main body 10 on which the layer which becomes the side gap portion 30 is provided is subjected to degreasing treatment in a nitrogen atmosphere under a predetermined condition, then fired at a predetermined temperature in a nitrogen-hydrogen-steam mixed atmosphere, and sintered to form the multilayer body 2.

Here, Mg of the side gap portion 30 migrates to the side of the internal electrode layer 15 during sintering. Thus, after sintering, Mg in the side gap portion 30 is segregated on the side of the inner electrode layer. Furthermore, the dielectric layer 14 and the side gap portion 30 are made of the same or substantially the same material. However, since the side gap portion 30 is affixed to the multilayer main body 10 including the dielectric layer 14, the interface is provided between the side gap portion 30 and the multilayer main body 10 even after sintering.

External Electrode Forming Step S5

Next, at both ends of the multilayer body 2, the foundation electrode layer 31, the conductive resin layer 32, and the plated layer 33 are sequentially formed to provide the external electrode 3.

Firing Step S6

Then, at a set firing temperature, heating for a predetermined time in a nitrogen atmosphere is performed. Thus, the external electrode 3 is baked to the multilayer body 2 to manufacture the capacitor main body 1A.

Wall Portion Forming Step S7

Next, the wall portion 5 is thermally cured after applying insulating resin to the end surface C, for example, thus forming the wall portion 5 on the surface on the side of the end surface C of the capacitor main body 1A. Through the above steps, the multilayer ceramic capacitor 1 is manufactured. However, the present invention is not limited thereto, and the wall portion 5 may be formed by applying a substrate including insulating resin as a main material component.

Mounting Step S8

Next, the step of mounting the multilayer ceramic capacitor 1 on the substrate 200 will be described. The terminal portions 201 are provided on the substrate 200, and the solder 202 is printed in advance on the terminal portion 201. The multilayer ceramic capacitor 1 is provided on the substrate 200 such that the external electrodes 3 are located on the terminal portions 201.

The substrate 200 on which the multilayer ceramic capacitor 1 is provided is heated to the reflow temperature of the solder 202 in a reflow furnace. Thus, the solder 202 melts, thus connecting the external electrodes and the terminal portions, a result of which the multilayer ceramic capacitor 1 is joined with the substrate 200.

In a case in which the wall portion 5 is not provided for the multilayer ceramic capacitor 1 during the reflow, for example, due to the wettability of the solder 202, the solder 202 expands outward farther than the multilayer ceramic capacitor 1 as shown by a dotted line 203, and rises along the side surface of the external electrode 3 to extend to a position in the stacking direction T at which the internal electrode layer 15 is provided.

In this situation, the vibration due to stress and mechanical strain generated when an electric field is applied to the internal electrode layer 15 is likely to be transmitted to the substrate 200 on which the multilayer ceramic capacitor 1 is mounted through the solder 202. With such a configuration, the entire substrate 200 defines and functions as an acoustic reflecting surface, and "acoustic noise", which is a vibration sound as noise, is generated.

However, the multilayer ceramic capacitor 1 in the present preferred embodiment includes the wall portion 5. The lower surface of the wall portion 5 is in contact with the substrate 200. Therefore, since the solder 202 provided between the external electrode 3 and the substrate 200 is blocked by the wall portion 5, the solder 202 flowing around the side surface of the external electrode 3 is prevented when it melts.

Therefore, such an event does not occur where the solder 202 expands outward farther than the multilayer ceramic capacitor 1 as shown by a dotted line 203, and rises along the side surface of the external electrode 3 to extend to a position in the stacking direction T at which the internal electrode layer 15 is provided. As a result, the generation of "acoustic noise" is reduced or prevented.

Furthermore, the protruding portions 51 of the wall portions 5 are in contact with the substrate 200, and thus a gap is provided between the substrate 200 and the side of the second main surface Ab of the multilayer main body 10. Therefore, the transmission of the vibration from the multilayer main body 10 to the substrate 200 is reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising: a multilayer body; two external electrodes; and two wall portions; wherein the multilayer body includes: a multilayer main body including an inner layer portion including a plurality of dielectric layers and a plurality of internal electrode layers alternately stacked, and two outer layer portions respectively on opposite sides of the inner layer portion in a stacking direction; two side gap portions on opposite sides of the multilayer main body in a width direction intersecting the stacking direction; two main surfaces on opposite sides in the stacking direction; two side surfaces on opposite sides in the width direction; and two end surfaces on opposite sides in a length direction intersecting the stacking direction and the width direction; the two external electrodes are each provided at one of the two end surfaces of the multilayer body, and each extending from the one of the two end surfaces to a portion of the main surface; the two wall portions respectively cover outermost surfaces of portions of the external electrodes provided at the two end surfaces, and each includes a protruding portion that protrudes beyond an outermost surface of a portion of the external electrodes provided at the main surface; and at least a portion of the outermost surface of the portion of the external electrodes provided at the main surface is exposed from the wall portions when viewed from one of the two main surfaces in the stacking direction, wherein the two wall portions are made of an insulating material.

2. The multilayer ceramic capacitor according to claim 1, wherein an interface is between the multilayer main body and the side gap portion.

3. The multilayer ceramic capacitor according to claim 1, wherein magnesium is segregated at a portion of the side gap portion in contact with the internal electrode layer.

4. The multilayer ceramic capacitor according to claim 1, wherein each of the two side gap portions includes:
   an inner side gap layer in contact with the multilayer main body; and
   an outer side gap layer in contact with the inner side gap layer.

5. The multilayer ceramic capacitor according to claim 1, wherein each of the two external electrodes includes:
   a foundation electrode layer including a conductive metal and a glass component, and contacting the multilayer body; and
   a conductive resin layer including a thermosetting resin and a metal component, and contacting the foundation electrode layer.

6. The multilayer ceramic capacitor according to claim 5, wherein each of the two external electrode includes a plated layer on the conductive resin layer.

7. The multilayer ceramic capacitor according to claim 1, wherein, in a cross section of the width direction and the stacking direction passing through a center or approximate center of the multilayer body, a line connecting ends at side surfaces of two adjacent internal electrode layers of the plurality of internal electrode layers in the stacking direction is convex toward outside.

8. The multilayer ceramic capacitor according to claim 1, wherein the multilayer body has a dimension in the length direction of about 0.2 mm or more and about 10 mm or less, a dimension in the width direction of about 0.1 mm or more and about 10 mm or less, and a dimension in the stacking direction of about 0.1 mm or more and about 5 mm or less.

9. The multilayer ceramic capacitor according to claim 1, wherein each of the plurality of dielectric layers has a thickness of about 0.5 µm or less.

10. The multilayer ceramic capacitor according to claim 1, wherein each of the plurality of dielectric layers includes $BaTiO_3$ as a main component.

11. The multilayer ceramic capacitor according to claim 10, wherein each of the plurality of dielectric layers includes at least one of Mn compounds, Fe compounds, Cr compounds, Co compounds, and Ni compounds as a subcomponent.

12. The multilayer ceramic capacitor according to claim 1, wherein each of the plurality of internal electrode layers includes at least one of Ni, Cu, Ag, Pd, Au, or Ag—Pd alloy.

13. The multilayer ceramic capacitor according to claim 1, wherein each of the plurality of internal electrode layers has a thickness of about 0.5 µm or more and about 2.0 µm or less.

14. The multilayer ceramic capacitor according to claim 1, wherein
   each of the two side gap portions includes a dielectric material including grains; and
   a particle size of the grains of the dielectric material decreases from an inner portion towards an outer portion of the two side gap portions.

15. The multilayer ceramic capacitor according to claim 14, wherein the particle size of the grains is about 400 nm or more and about 450 nm or less at an outermost side of the outer portion, and about 600 nm or more at an innermost side of the inner portion.

16. The multilayer ceramic capacitor according to claim 14, wherein the particle size of the grains at an innermost side of the inner portion is about 1.5 times or more than the particle size of the grains at the outermost side of the outer portion.

17. The multilayer ceramic capacitor according to claim 1, wherein a thickness of each of the two outer layer portions is about 20 µm or more and about 60 µm or less.

18. The multilayer ceramic capacitor according to claim 1, wherein a thickness of each of the two outer layer portions is about 20 µm or more and about 40 µm or less.

19. The multilayer ceramic capacitor according to claim 1, wherein the two wall portions respectively completely cover the two end surfaces and extend to at least one of the two main surfaces and to at least one of the two side surfaces.

20. The multilayer ceramic capacitor according to claim 1, wherein a protruding amount of the protruding portion on the main surface is about 5% or more of a thickness of the multilayer body in the stacking direction.

* * * * *